United States Patent
Deng et al.

(10) Patent No.: US 8,937,683 B2
(45) Date of Patent: Jan. 20, 2015

(54) APPARATUS AND METHOD FOR INVERSE TELECINE WITH LOCAL VIDEO DE-INTERLACING

(75) Inventors: Xiaoyun Deng, Singapore (SG); Lucas Hui, Singapore (SG)

(73) Assignee: STMicroelectronics Asia Pacific Pte Ltd, Singapore (SG)

(*) Notice: Subject to any disclaimer, the term of this patent is extended or adjusted under 35 U.S.C. 154(b) by 335 days.

(21) Appl. No.: 13/174,413

(22) Filed: Jun. 30, 2011

(65) Prior Publication Data

US 2013/0002886 A1   Jan. 3, 2013

(51) Int. Cl.
*H04N 7/01* (2006.01)
*H04N 11/20* (2006.01)

(52) U.S. Cl.
CPC ................................. *H04N 7/012* (2013.01)
USPC ........................... 348/452; 348/448; 348/441

(58) Field of Classification Search
USPC .......................................................... 348/180
See application file for complete search history.

(56) References Cited

U.S. PATENT DOCUMENTS

| | | | |
|---|---|---|---|
| 5,347,314 A | 9/1994 | Faroudja et al. | |
| 6,628,341 B1 | 9/2003 | Staley et al. | |
| 7,075,581 B1 | 7/2006 | Ozgen et al. | |
| 7,405,766 B1 | 7/2008 | Chou et al. | |
| 8,174,614 B2 | 5/2012 | Asamura et al. | |
| 2006/0171457 A1 | 8/2006 | DeGarrido et al. | |
| 2007/0188662 A1* | 8/2007 | Winger et al. | 348/701 |
| 2007/0291169 A1 | 12/2007 | Eymard et al. | |
| 2007/0296870 A1* | 12/2007 | Foret | 348/701 |
| 2008/0062308 A1 | 3/2008 | Zhai et al. | |
| 2008/0106642 A1 | 5/2008 | Shrinivasan et al. | |
| 2008/0181517 A1 | 7/2008 | Aokage | |
| 2008/0278623 A1 | 11/2008 | Lu et al. | |
| 2009/0167938 A1 | 7/2009 | Matsuoka et al. | |
| 2009/0244370 A1 | 10/2009 | Tang | |
| 2009/0322940 A1 | 12/2009 | Kempf | |
| 2010/0254453 A1 | 10/2010 | Dane et al. | |
| 2011/0019083 A1 | 1/2011 | Cordes et al. | |

* cited by examiner

*Primary Examiner* — Jefferey Harold
*Assistant Examiner* — Michael Teitelbaum
(74) *Attorney, Agent, or Firm* — Allen, Dyer, Doppelt, Milbrath & Gilchrist, P.A.

(57) ABSTRACT

The present invention relates to systems and methods for inverse telecine or video de-interlacing for picture quality improvement on set-top-box and TV products. The system comprises a film mode detector at the picture or sequence level, a global mixed video and film content detector at the region, picture, or sequence level on top of the detected film content, and a local video content detector at pixel level on top of the detected mixed video and film content. Inverse telecine processing is applied on detected film content fading in with a locally de-interlaced local video content. The invention further provides an apparatus and method for globally detecting mixed video and film content at region, picture, or sequence level. Such apparatus and method comprise a plurality of detectors for robustness and increased detection accuracy.

25 Claims, 11 Drawing Sheets

APPARATUS AND METHOD FOR INVERSE TELECINE WITH LOCAL VIDEO DE-INTERLACING

RELATED APPLICATIONS

The present application relates to co-pending U.S. patent application Ser. No. 12/978,154, filed on Dec. 23, 2010, and U.S. patent application Ser. No. 13/174,194, filed concurrently.

BACKGROUND OF THE INVENTION

1. Field of the Invention

The present invention generally relates to an apparatus and method for inverse telecine and video de-interlacing, and, more particularly, to a cadence detection system and method that is programmable to improve picture quality of broadcasted videos with mixed video and film mode sources in TV and set-top-box (STB) products.

2. Relevant Background

Interlaced video was used for cathode ray tube (CRT) displays and is found throughout a number of broadcasting formats. Modern video displays, e.g., liquid crystal displays (LCD) and plasma displays, do not operate in interlaced mode. Therefore, de-interlacing circuitry is needed in set-top-box (STB)/TV to de-interlace video into progressive video that can be played on modern video displays.

Currently, there are a number of different source formats. Video formats usually display at 50 or 60 frames per second; film formats are commonly captured at 24 or 25 frames per second. Because of the difference in frame rate, telecine is applied to a film source video in order to properly display the film source video on a video display. Reverse telecine may be applied to the telecined film source video to recover a higher quality non-interlaced video to display on a compatible device, such as a modern video display.

Cadence detection involves finding the source format of a sequence of video fields or detects the absence of motion between frames (still pictures) and determines whether a video is originally from a video or film source that had interlacing or telecine applied. De-interlacing or inverse telecine can be appropriately applied to the video after cadence detection in order to remove the selected filtering.

Mixed video and film sources are commonly seen in broadcasted videos, e.g., graphics overlap over video or scrolling text on a film-source video. A global film mode detection and global switching between inverse telecine and video de-interlacing mode is suboptimal in this case as it would leave either compromised vertical resolution or unhandled feathering/comb artifacts on the part of the unremoved interlace or telecine filtering.

U.S. Patent Publication No. 2007/0291169, "Region-Based Cadence Detector," discusses blocked based film/video decision and switching. A frame is segmented into a pre-set number of regions (or clusters of blocks) for cadence and phase tracking. A block level inverse telecine or video de-interlacing is applied to the mixed source video. However, region-based cadence detection suffers in picture quality and robustness due to artifacts from the switching.

Accordingly, there is a need in the art for increasing detection accuracy to prevent feather/comb artifacts on moving video object areas and increasing robustness of film and video mode detection to improve picture quality of mixed cadence sources.

SUMMARY OF THE INVENTION

Accordingly, the invention is directed to an apparatus and method for inverse telecine or video de-interlacing for picture quality improvement that substantially obviates one or more of the problems due to limitations and disadvantages of the related art.

Briefly stated, the present invention involves film and video mode detections at both a global and local level. Film mode can be detected at a global level. Confidence of detection is increased by introducing a two-step check for mixed video content, one at a global level when film mode is detected and another at a local level when mixed video content is detected at a global level. Mixed video content detection methods can be further separately optimized for global and local detection.

BRIEF DESCRIPTION

DETAILED DESCRIPTION OF THE PREFERRED EMBODIMENTS

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying figures is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

The present invention involves film and video mode detections at both a global and local level. Film mode can be detected at a global level. Confidence of detection is increased by introducing a two-step check for mixed video content, one at a global level when film mode is detected and another at a local level when mixed video content is detected at a global level. Mixed video content detection methods can further be separately optimized for global and local detection.

Reference will now be made in detail to an embodiment of the present invention, an example of which is illustrated in the accompanying drawings.

Figure 1:
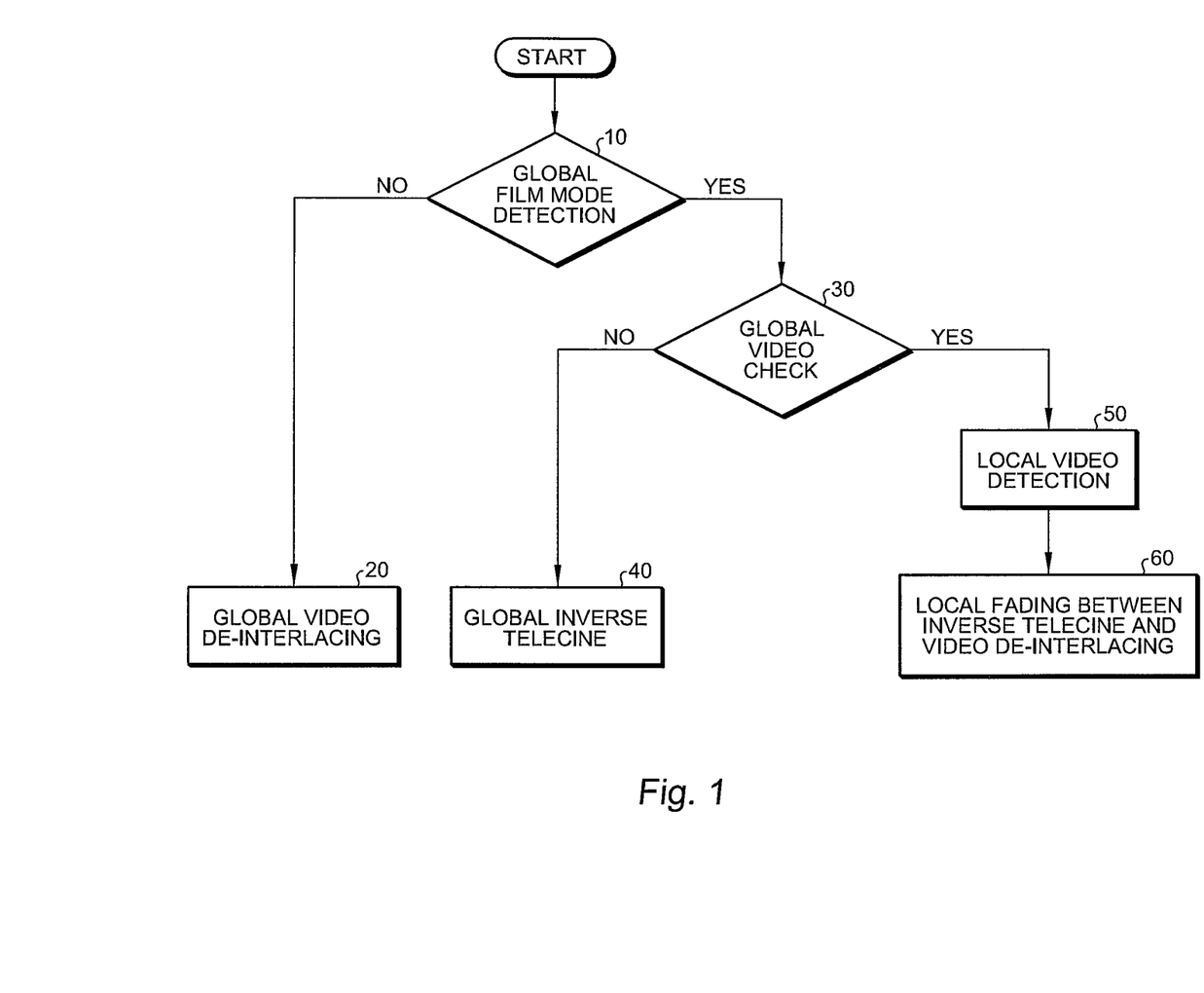
FIG. 1 is an exemplary diagram of a video processing system and method for inverse telecine and/or video de-interlacing according to an embodiment of the invention.

FIG. 1 illustrates a video processing system and method for inverse telecine and/or video de-interlacing according to an embodiment of the invention.

The video processing system according to an embodiment of the invention comprises global film mode detection 10, global video de-interlacing 20, global video checker 30, global inverse telecine 40, local video detection 50, and local fading between inverse telecine and video de-interlacing 60.

Global film mode detection 10 detects film mode globally at picture or sequence level. An example of global film mode detection 10 is disclosed in U.S. patent application Ser. No. 12/978,154. Global video de-interlacing 20 is applied when no film content is detected globally by global film mode detection 10.

If global film mode is detected by global film mode detection 10, global video checker 30 detects video mode at a region, picture or sequence level. Global inverse telecine 40 is applied when there is no mixed video and film content detected.

If global video mode is detected by global video checker 30, indicating that there is mixed video and film content detected, local video detection 50 detects local video mode at the pixel level. An example of local video detection 50 is [disclosed in U.S. patent application Ser. No. 13/174,194]. Pixel level local fading between inverse telecine and video de-interlacing 60 is applied based on result of local video detection 50.

One of ordinary skill in the art would appreciate that by introducing a two step check for mixed video content, one at the global level when film mode is detected and the other at the local level when mixed video content is detected globally, confidence of detection is increased. Further, the two step check process could be separately optimized for global and local detection respectively.

The video processing system according to an embodiment of the invention is configured to receive a video signal from DVD, cable or satellite TV channel broadcasters, or internet video providers, and outputs a processed video signal for optimal display on modern flat screen panels.

Figure 2:
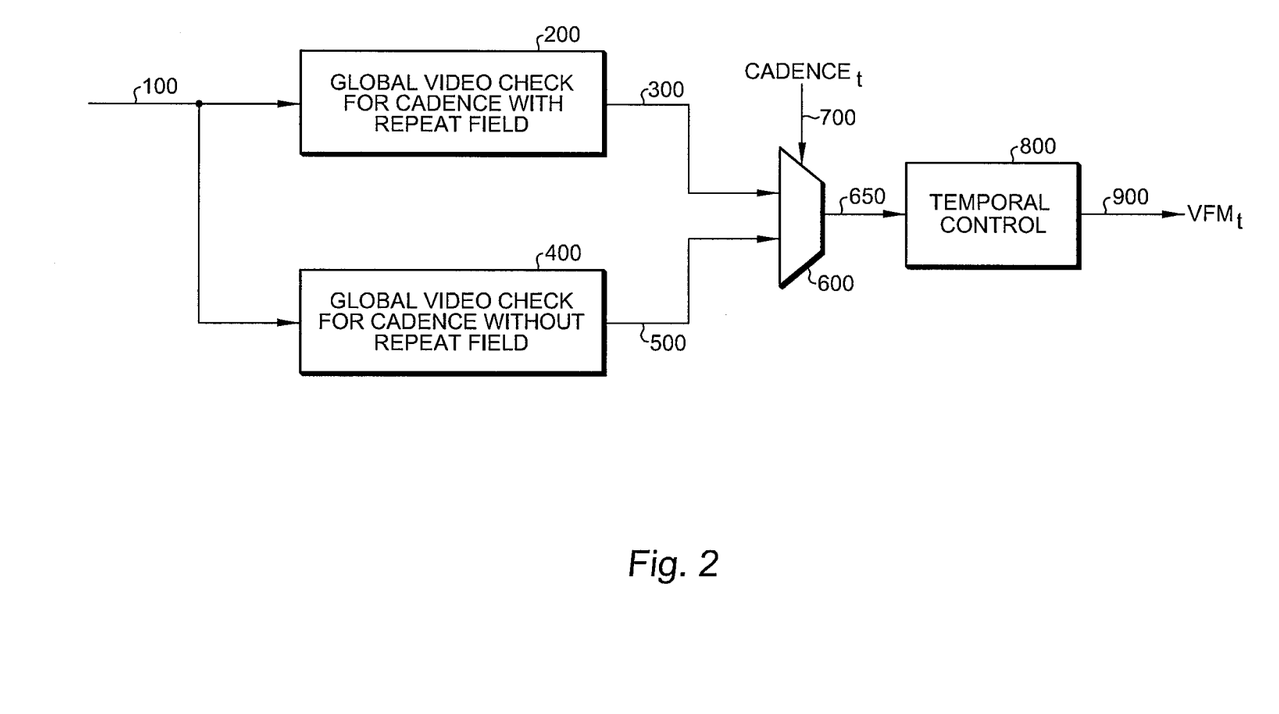
FIG. 2 is an exemplary diagram of an embodiment of a global video checker according to an embodiment of the invention.

FIG. 2 illustrates a global video checker according to an embodiment of the invention.

The global video checker unit receives a video input signal 100, a cadence signal 700 from a global film mode detector in a video processing system such as global film mode detection 10 in FIG. 1, and outputs a video fallback mode flag 900. The global video checker comprises a global video check for cadence with repeat field unit 200, a global video check for cadence without repeat field unit 400, a multiplexer 600 coupled to the global video check for cadence with/without repeat field units 200 and 400, and a temporal control unit 800 coupled to multiplexer 600.

The global video check for cadence with repeat field unit 200, described in detail below with reference to FIG. 3, receives the video input signal 100 and outputs a video fallback mode flag 300 for cadences with repeat field.

The global video check for cadence without repeat field unit 400, described in detail below with reference to FIG. 5, receives the video input signal 100 and outputs a video fallback mode flag 500 for cadences without repeat field.

The multiplexer 600 selects either video fallback mode flag 300 or 500 according to the type of the cadence, i.e., if the cadence is with repeat field or not, and outputs a video fallback mode flag 650 indicating the existence of mixed video and film content. The cadence signal 700 could be provided by an external global film mode detector in a video processing system such as global film mode detection 10 in FIG. 1. By adopting two separate methods of global video check for cadences with and without repeat field, the global video check unit could detect video mixed with various cadences; thus, the robustness of the detection could be improved.

In order to avoid temporal instability, the temporal control unit 800 receives the video fallback mode flags 650 from a plurality of fields, and outputs the temporally converged video fallback mode flag 900.

Figure 3:
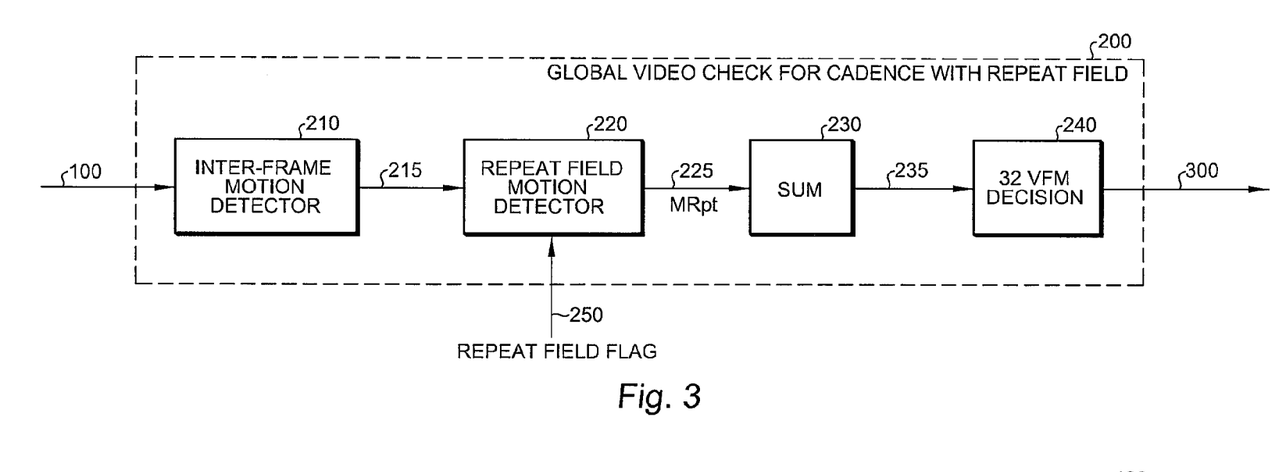
FIG. 3 is an exemplary diagram of a global video checker for cadence with repeat field according to an embodiment of the invention.

FIG. 3 illustrates a global video check for cadence with repeat field unit according to an embodiment of the invention.

The global video check for cadence with repeat field unit 200 receives the video input signal 100, and provides a video fallback mode flag 300 for cadences with repeat field. According to one embodiment, the global video checker for cadence with repeat field unit 200 comprises an inter-frame motion detector 210, which could usually be shared with an external global film mode detector or an external de-interlacer, a repeat field motion detector 220 coupled to inter-frame motion detector 210, a summing unit 230 coupled to repeat field motion detection 220, and a video fallback mode decision unit 240 coupled to summing unit 230.

Figure 4:
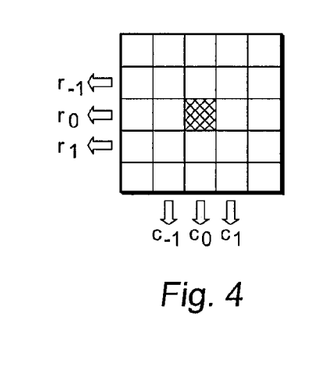
FIG. 4 is a diagram illustrating an example window used by a repeat field motion detector.

The repeat field motion detector 220 receives a repeat field flag 250 from an external global film mode detector and a plurality of inter-frame motion values 215 in a neighborhood window, compares these inter-frame motion values with a motion threshold when the current field is a repeat field, and provides a detected repeat field motion flag for the center pixel of the neighborhood window based on the density of the motion in this local window. An example method of the repeat field motion detector 220 is illustrated with Equation 1 (a) to (d), with the neighborhood window used in this example method shown in FIG. 4.

$$vfreq_k = \begin{cases} freq_{k,1} - freq_{k,2} & fielddiff_k \geq MonotoneTh \\ 0 & otherwise \end{cases} \quad \text{Eqn 1(a)}$$

$$k = 0, 1, 2$$

where

-continued $$freq_{k,1} = \sum_{i=0}^{3} ((y_{k+i} - \text{mean}_k) \cdot (y_{k+i+1} - \text{mean}_k) < 0) \quad \text{Eqn 1(b)}$$

$$freq_{k,2} = \sum_{i=0}^{2} ((y_{k+i} - \text{mean}_k) \cdot (y_{k+i+2} - \text{mean}_k) < 0) \quad \text{Eqn 1(c)}$$

$$\text{mean}_k = ((y_k + y_{k+2} + y_{k+4}) \times 2 + (y_{k+1} + y_{k+3}) \times 3 + 6)/12 \quad \text{Eqn 1(d)}$$

The summing unit 230 receives a plurality of the detected repeat field motion 225, accumulates them in a block, a region, or a field, and provides a repeat field motion sum 235 for the video fallback mode decision unit 240.

The video fallback mode decision unit 240 receives the summed repeat field motion 235, compares it with a user defined threshold, and outputs a binary signal indicating if mixed video and film content exists in the targeted block, region, or field. This binary signal is the video fallback mode flag 300.

Figure 5:
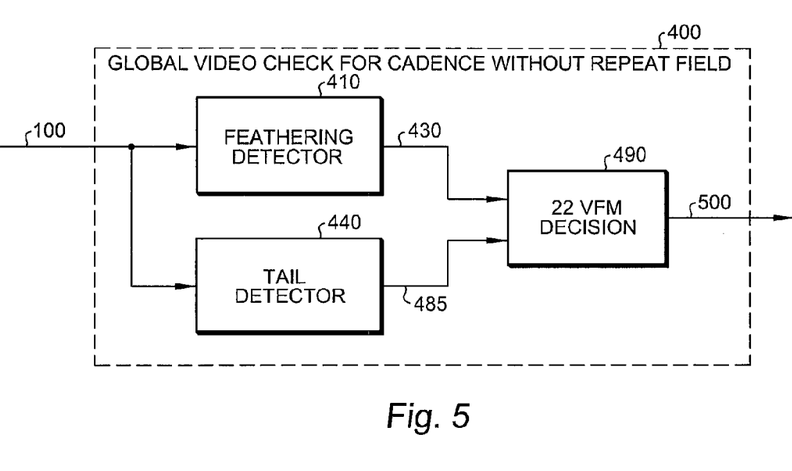
FIG. 5 is an exemplary diagram of a global video checker for cadence without repeat field unit according to an embodiment of the invention.

FIG. 5 illustrates a global video check for cadence without repeat field unit according to an embodiment of the invention.

The global video check for cadence without repeat field unit 400 receives the video input signal 100, and provides a video fallback mode flag 500 for cadences without repeat field. In one embodiment, the global video checker for cadence without repeat field 400 comprises a feathering detector 410, a tail detector 440, and a video fallback mode decision unit for cadences without repeat field 490 coupled to the feathering detector 410 and the tail detector 440.

The feathering detector 410, described in detail below with reference to FIG. 6, receives a plurality of fields of the video input signal 100, and provides a summed feathering value 430 to the video fallback mode decision unit 490.

The tail detector 440, described in detail below with reference to FIG. 10, receives a plurality of fields of the video input signal 100, and provides a summed tail value 485 to the video fallback mode decision unit 490.

The video fallback mode decision for cadence without repeat field unit 490 receives the summed feathering value 430 and the summed tail value 485, compares them with their respective user defined thresholds, and decides if mixed video and film content exist based on the result of the feathering detector 410 and/or the result of the tail detector 440.

Figure 6:
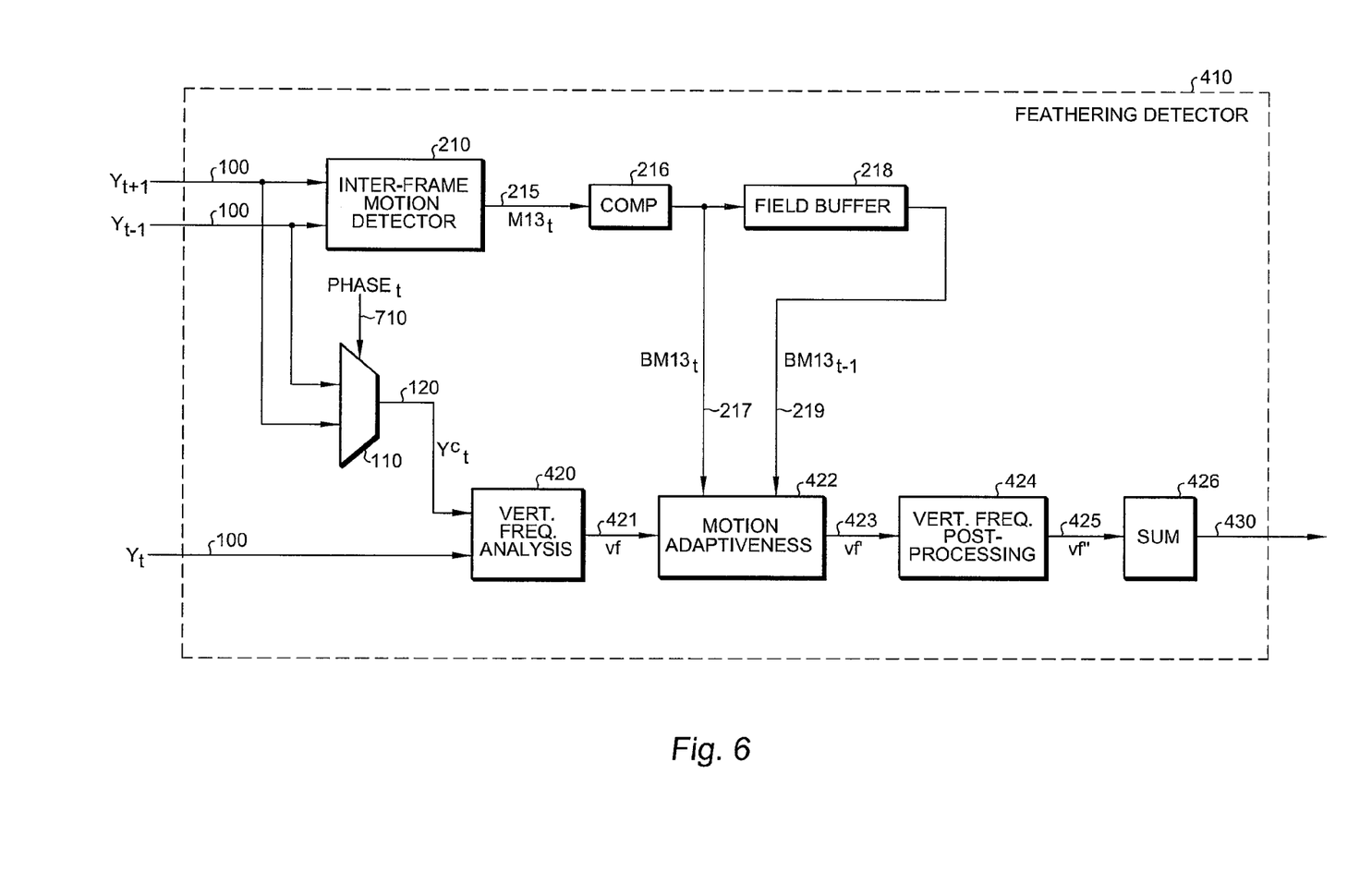
FIG. 6 is an exemplary diagram of a feathering detector according to an embodiment of the invention.

FIG. 6 illustrates a feathering detector according to an embodiment of the invention. Feathering detector 410 further comprises an optional inter-frame motion detector 210, an optional comparator 216 coupled to optional inter-frame motion detector 210, a field buffer 218 coupled to comparator 216, a multiplexer 110, a vertical frequency analysis unit 420 coupled to multiplexer 110, a motion adaptiveness unit 422 coupled to comparator 216 and field buffer 218, a vertical frequency post-processing unit 424 coupled to motion adaptiveness unit 422, and a summing unit 426 coupled to vertical frequency post-processing unit 424.

The inter-frame motion detector 210, which could usually be shared with a global film mode detector or a de-interlacer in a video processing system as in FIG. 1, receives a previous field and a next field of the video input signal 100 at times t−1 and t+1, respectively, and provides an inter-frame motion signal 215.

In one embodiment, the optional comparator 216 compares the inter-frame motion signal 215 with a pre-defined motion threshold, and provides a binary motion value 217 to the field buffer 218 for cost saving purposes. In another embodiment without comparator 216, the field buffer 218 would have to store the inter-frame motion values at their full precision and this could lead to more hardware costs.

The multiplexer 110 receives the previous field and the next field of the video input signal 100, selects one of them as the coupling field signal 120 according to the phase information 710 received from an external global film mode detector.

Figure 7:
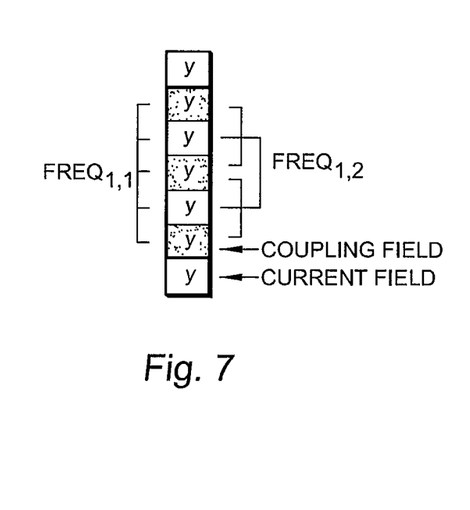
FIG. 7 is a diagram illustrating a processing window of a vertical frequency analyzer.

The vertical frequency analysis unit 420 receives a plurality of pixels from the current field and the coupling field of the video signal 100, and provides the detected feathering values 421. An example method of the vertical frequency analysis is illustrated with reference to Equation 2 (a) to (f). The used input pixel window, including the even numbered pixels from the current field and the odd numbered pixels from the coupling field, is shown in FIG. 7.

$$vfreq_k = \begin{cases} freq_{k,1} - freq_{k,2} & fielddiff_k \geq MonotoneTh \\ 0 & \text{otherwise} \end{cases} \quad \text{Eqn 2(a)}$$

$$k = 0, 1, 2$$

where $$freq_{k,1} = \sum_{i=0}^{3} ((y_{k+i} - \text{mean}_k) \cdot (y_{k+i+1} - \text{mean}_k) < 0) \quad \text{Eqn 2(b)}$$

$$freq_{k,2} = \sum_{i=0}^{2} ((y_{k+1} - \text{mean}_k) \cdot (y_{k+i+2} - \text{mean}_k) < 0) \quad \text{Eqn 2(c)}$$

$$\text{mean}_k = ((y_k + y_{k+2} + y_{k+4}) \times 2 + (y_{k+1} + y_{k+3}) \times 3 + 6)/12 \quad \text{Eqn 2(d)}$$

and $$fielddiff_k = |(y_k + y_{k+2} + y_{k+4}) \times 2 - (y_{k+1} + y_{k+3}) \times 3|/12 \quad \text{Eqn 2(e)}$$

$$vf = \begin{cases} \max(vfreq_0, vfreq_1) & currfield = \text{top} \\ \max(vfreq_1, vfreq_2) & currfield = \text{bottom} \end{cases} \quad \text{Eqn 2(f)}$$

Figure 8:
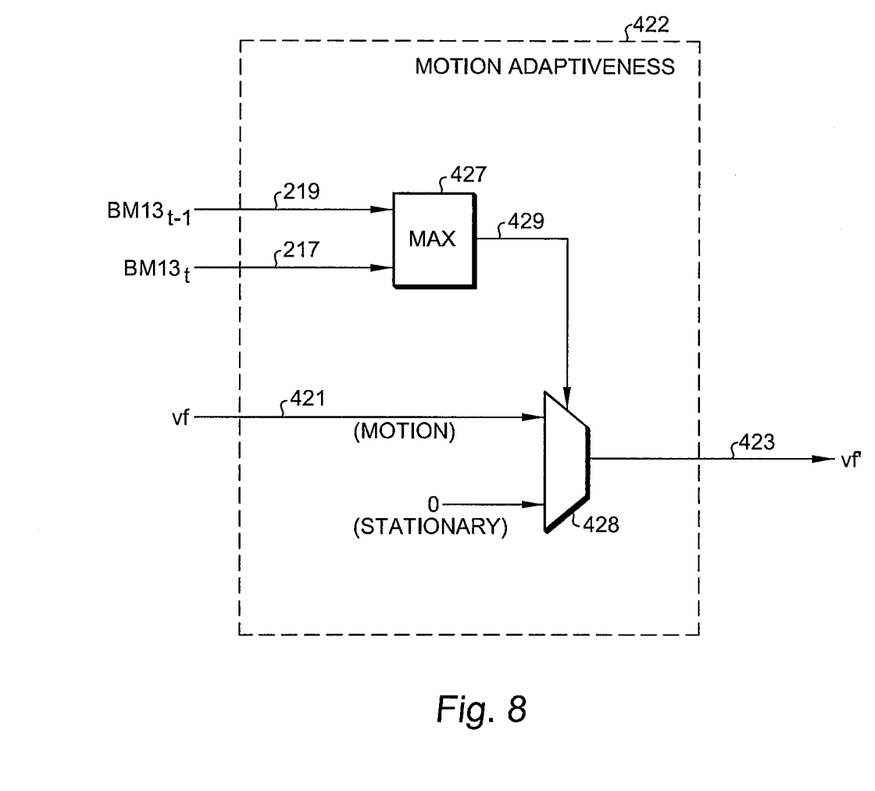
FIG. 8 is an exemplary diagram of a motion adaptiveness unit according to an embodiment of the invention.

FIG. 8 illustrates a motion adaptiveness unit according to an embodiment of the invention. The motion adaptiveness unit 422 receives the detected feathering value 421, the recursive inter-frame motion values 217 and 219 at times t and t−1, respectively, and provides a moving feathering signal 423. The motion adaptiveness unit 422 further comprises a max operator 427 and a multiplexer 428 coupled to max operator 427. The max operator 427 receives the recursive inter-frame motion values 217 and 219, and outputs the maximum motion value 429 to the multiplexer 428. The multiplexer 428 then outputs the detected feathering value 421 if the maximum motion value 429 is classified as motion, or else outputs '0' as the moving feathering value 423. The motion adaptiveness unit 422 improves the accuracy of the feathering detection since video pixels exhibit feathering artifacts only at moving areas.

Figure 9:
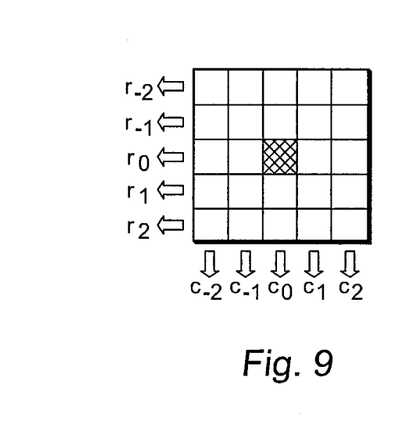
FIG. 9 is a diagram illustrating an example neighborhood window used in a vertical frequency post-processing unit.

The vertical frequency post-processing unit 424 in FIG. 6 receives a plurality of the moving feathering values 423 in a local neighborhood window and provides a post-processed feathering value 425. An example method of the vertical frequency post-processing is illustrated with reference to Equation 3 (a) to (e), with the used input neighborhood window as shown in FIG. 9.

$$vf'' = \begin{cases} vf' & (vf'_{0,0} > VFTh) \& (((sum \geq VFSumTh) \& \\ & (rcnt = \text{true})) | (c_0 \geq VFColTh \times 4))) \\ 0 & \text{otherwise} \end{cases} \quad \text{Eqn 3(a)}$$

-continued where $$\text{sum} = \sum_{j=-2}^{2} c_j \qquad \text{Eqn 3(b)}$$

$$c_j = \sum_{i=-2}^{2} vf'_{i,j} \qquad \text{Eqn 3(c)}$$

and $$\text{rcnt} = \qquad \text{Eqn 3(d)}$$
$$((r_{-2} \geq \text{VFRowTh}) \ \& \ (r_{-1} \geq \text{VFRowTh}) \ \& (r_0 \geq \text{VFRowTh}) \ \&$$
$$(r_1 \geq \text{VFRowTh}) \ \& \ (r_2 \geq \text{VFRowTh}))$$

$$r_i = \sum_{j=-2}^{2} (vf'_{i,j} > \text{VFTh}) \ i \in [-2, 2] \qquad \text{Eqn 3(e)}$$

Figure 10:
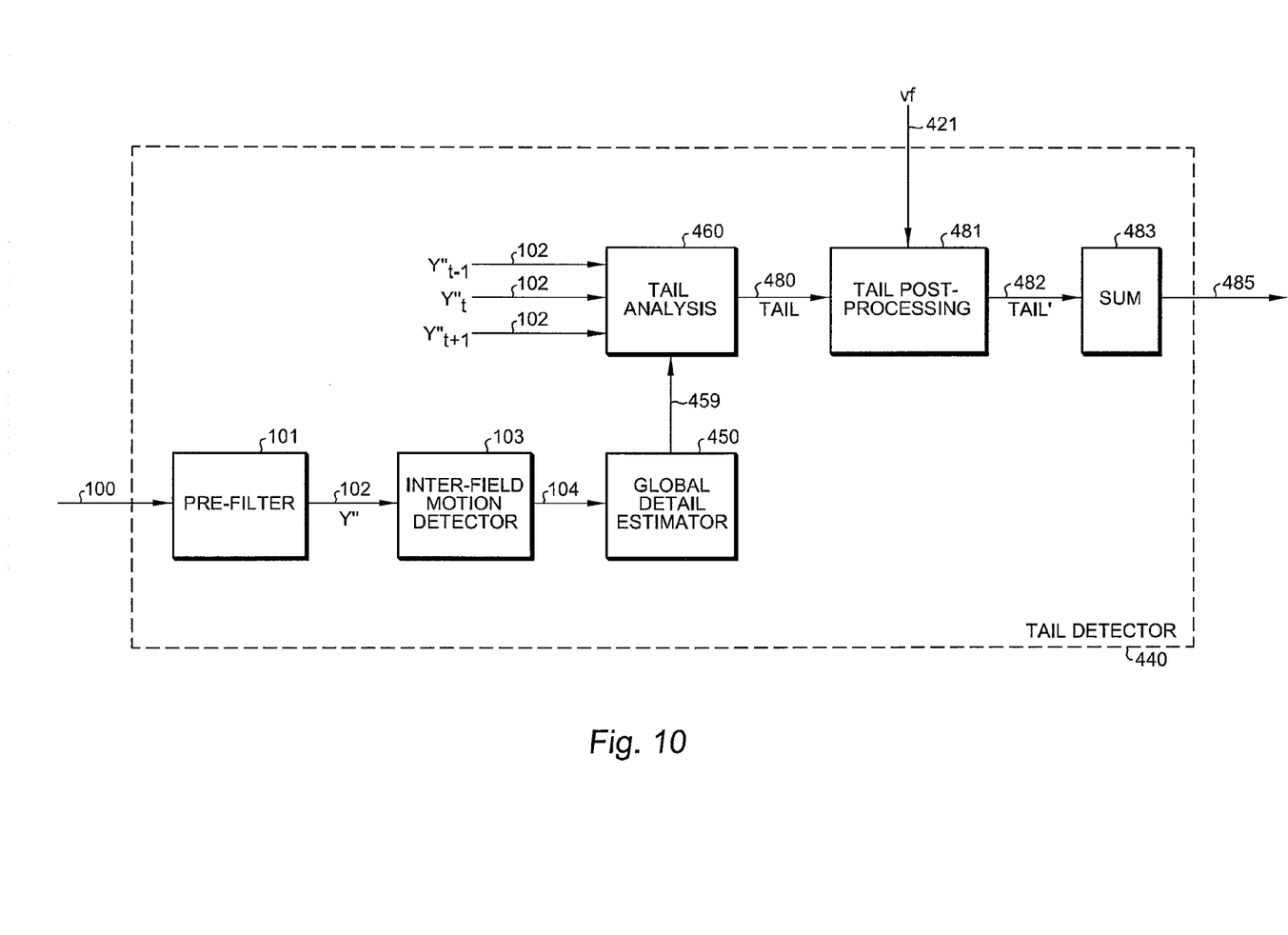
FIG. 10 is an exemplary diagram of a tail detector according to an embodiment of the invention.

FIG. 10 illustrates tail detector 440 according to an embodiment of the invention.

The tail detector 440 comprises an optional pre-filter 101, an optional inter-field motion detector 103 coupled to pre-filter 101, a global detail estimator 450 coupled to inter-field motion detector 103, a tail analysis unit 460 coupled to global detail estimator 450, a tail post-processing unit 481 coupled to tail analysis unit 460, and a summing unit 483 coupled to tail post-processing unit 481.

The optional pre-filter 101 is often able to be shared with a global film mode detector in a video processing system as described in FIG. 1, and is configured to correct the phase of the input video signal vertically based on the top/bottom parity of the field and provides a phase-corrected video signal 102.

The inter-field motion detector 103 is also able to be shared with a global film mode detector in a video processing system as described in FIG. 1, and is configured to receive a plurality of fields of the phase-corrected video signal 102, and provide the detected inter-field motion between consecutive fields 104 to the global detail estimator 450.

Figure 11:
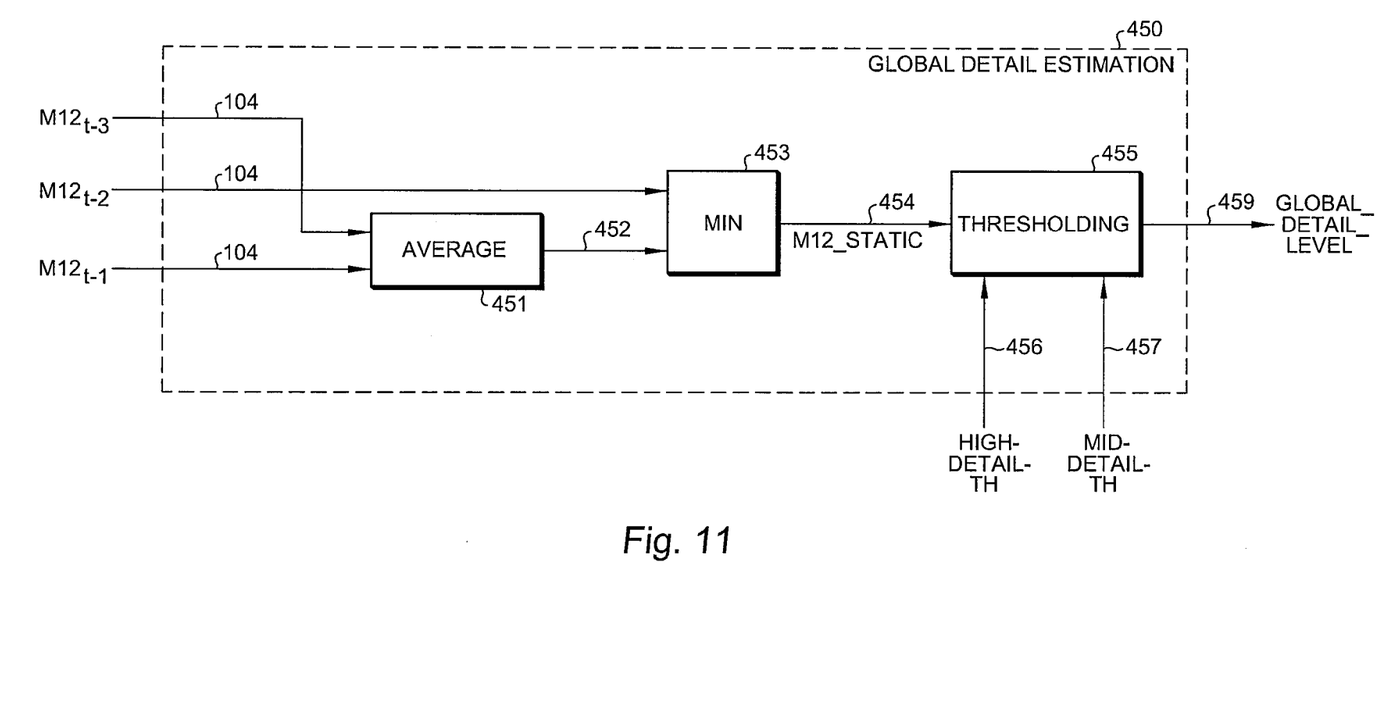
FIG. 11 is an exemplary diagram of a global detail estimator according to an embodiment of the invention.

The global detail estimator 450, described in detail below with reference to FIG. 11, is configured to receive a plurality of the existing inter-field motion signal between consecutive fields 104, and provides an estimation of the global detail level 459 for the tail analysis.

The tail analysis unit 460, described in detail below with reference to FIG. 13, receives a plurality of fields of the video signal 102 and the global detail level 459 and provides a global detail adaptive tail signal 480. Being global detail level adaptive, the tail analysis is robust to vertical details of the picture content which often affects the accuracy of the tail motion detection. In a preferred embodiment, the video signal 102 is received from an optional pre-filter 101.

The tail post-processing unit 481, described in detail below with reference to FIG. 14, receives the tailing motion 480. Optionally, it also receives the feathering value 421 to aid the tailing motion detection and provides a post-processed tail motion 482.

The summing unit 483 then accumulates the post-processed tail motion in a block, region, or field and outputs the summed value 485 to the video fallback mode decision for cadence without repeat field 490.

Referring now to FIG. 11, an exemplary diagram of a global detail estimator is depicted in accordance with an embodiment. The global detail estimator 450 comprises an average operator 451, a min operator 453 coupled to average operator 451, and a thresholding unit 455 coupled to min operator 453. The average operator 451 receives the existing inter-field motions 104 at times t−3 and t−1 and outputs the average of them 452. The min operator 453 receives the average of the inter-field motion at times t−3 and t−1 and the inter-field motion at time t−2 and provides the minimum value 454 of the two, namely m12_static. Finally, the thresholding unit 455 compares the minimum value 454 with a set of thresholds such as the HighDetailTh 456 and the MidDetailTh 457 and provides the classified global detail level 459.

Figure 12A:
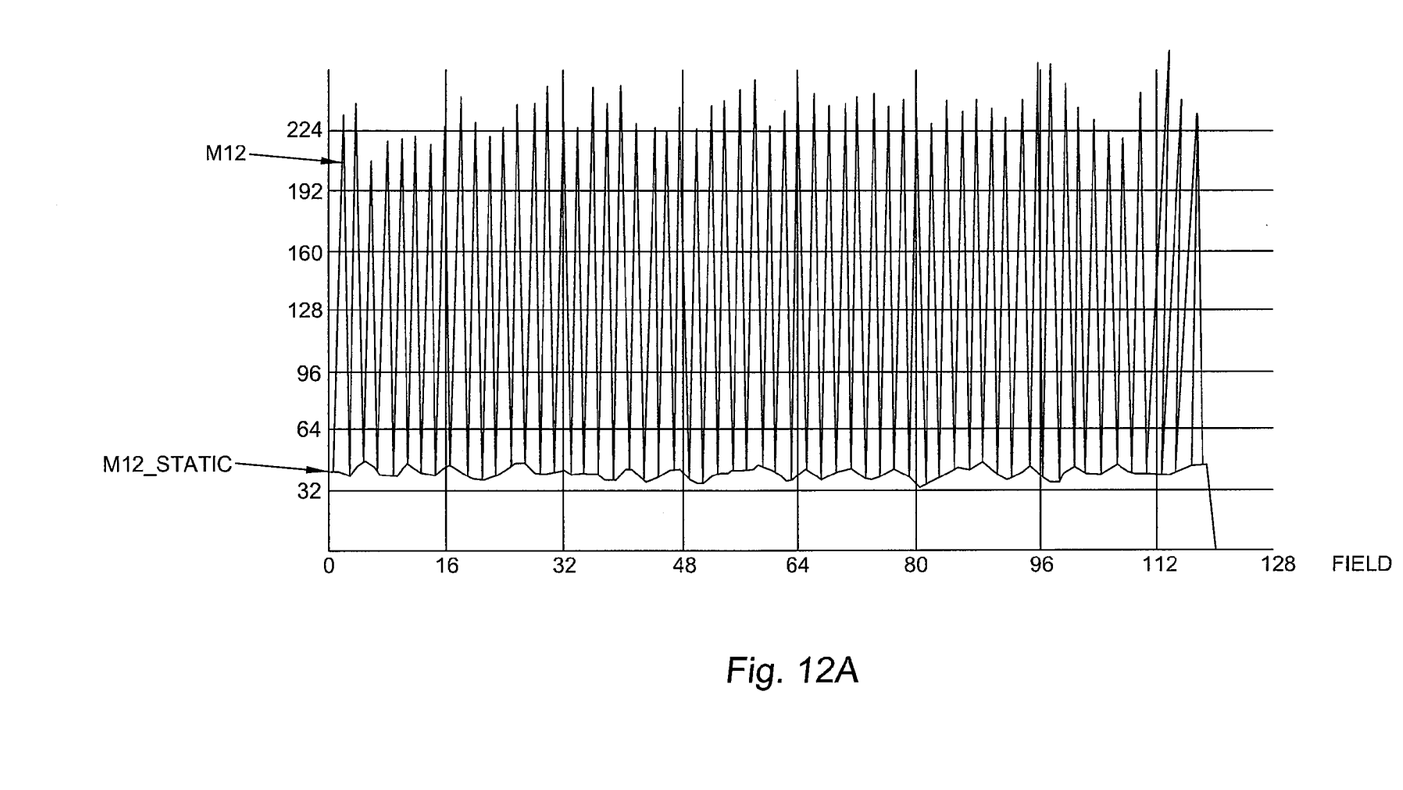
FIGS. 12(a) and 12(b) are examples of inter-field motions and global detail levels for explanation of an embodiment of global detail estimator.
Figure 12B:
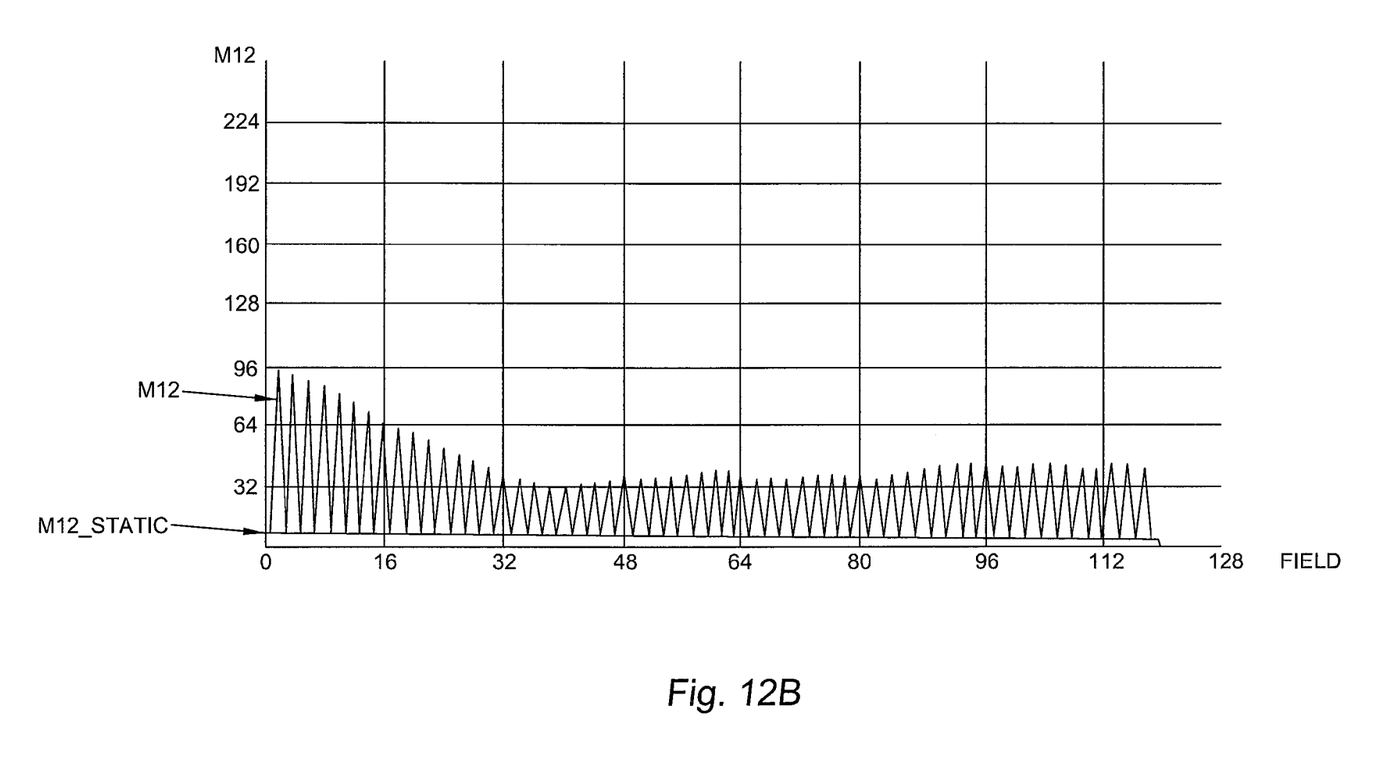

As understood by one of ordinary skill in the art, the inter-field motions 104 of a film source exhibit high when the two fields are from different progressive frames and exhibit low when the two fields are from the same progressive frame. The calculated min value 454 (m12_static) is actually the lower value of the inter-field motions, which also represents the vertical detail level of a picture. FIGS. 12(a) and (b) illustrate examples of inter-field motions along the time and the respective m12_static. The example in FIG. 12 (a) could be from a picture with a lot of vertical details whereas the example in FIG. 12 (b) could be from a picture with little vertical details, as could be told by the value of m12_static.

Figure 13:
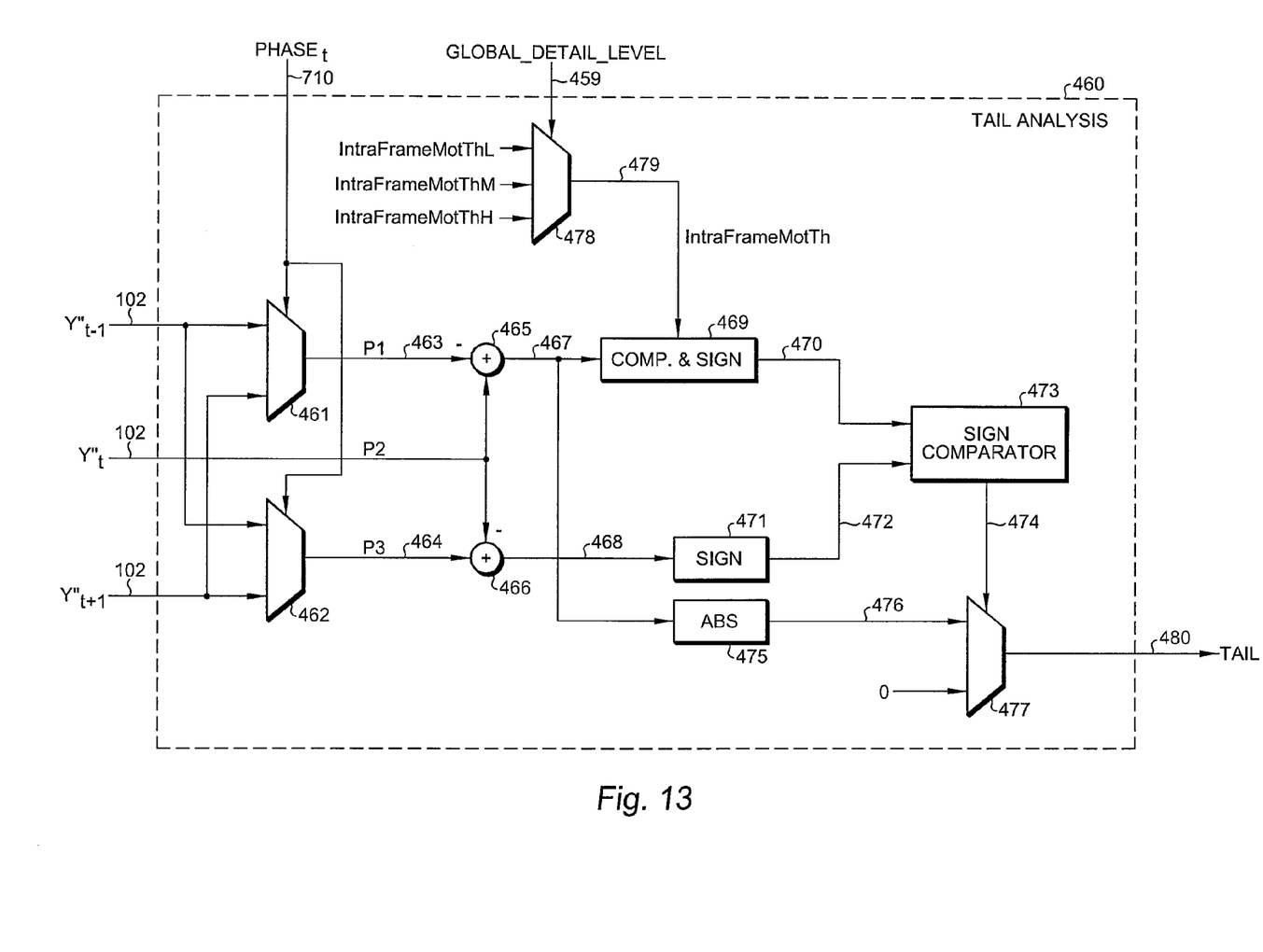
FIG. 13 is an exemplary diagram of a tail analysis unit according to an embodiment of the invention.

FIG. 13 is an exemplary diagram of tail analysis unit 460 according to an embodiment of the invention. The tail analysis unit 460 comprises two multiplexers 461 and 462, two adders 465 and 466 coupled to multiplexers 461 and 462, respectively, multiplexer 478, a comparator and sign unit 469 coupled to adder 465 and multiplexer 478, a sign unit 471 coupled to adder 466, a sign comparator 473 coupled to comparator and sign unit 469 and sign unit 471, an absolute operator 475 coupled to adder 465, and a multiplexer 477 coupled to sign comparator 473 and absolute operator 475.

The multiplexer 461 receives the video signals 102 at times t−1 and t+1, and selects one of them as the coupling field 463 of the current field at time t according to the phase information 710 from an external global film mode detector. The multiplexer 462, in contrary to 461, selects the other field that has not been selected by 461, which is the field 464.

The adder 465 provides the difference 467 between the field at time t and the field 463. The other adder 466 provides the difference 468 between the field 464 and the field at time t.

The comparator and sign unit 469 compare the difference 467 with a threshold IntraFrameMotTh 479 and decide the sign 470, where the threshold 479 is selected by the multiplexer 478 from a set of thresholds based on the global detail level 459. The sign unit 471 decides the sign of the difference 468.

The sign comparator 473 compares the received signs 470 and 472 and provides output 474 indicating whether the differences 467 and 468 are of the same sign.

The multiplexer 477 provides the absolute value 476 of the difference 467 from the absolute operator 475 if the differences 467 and 468 are of the same sign and outputs zero when they are not.

One of ordinary skill in the art would appreciate that the sign comparator 473 with the comparator and sign unit 469 and the sign unit 471 is used to detect tailing motion, indicated by the same sign of the motion differences 467 and 468. Tailing motion is especially useful to detect continuous motion in one direction and, hence, false alarms of motion, i.e. those motions in random directions, would be excluded from the detected tail 480.

Figure 14:
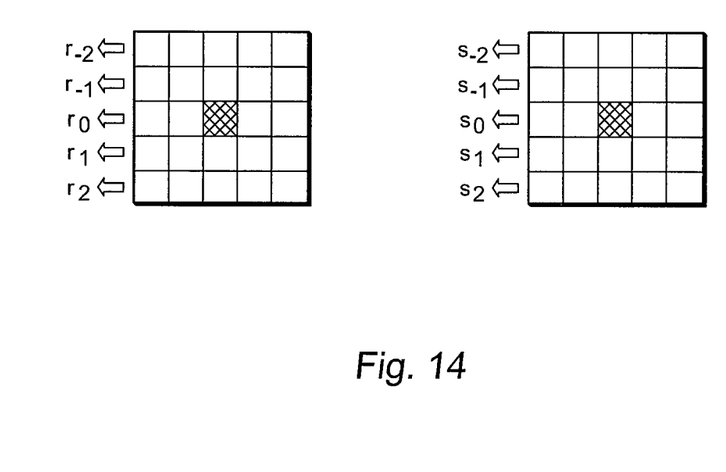
FIG. 14 is a diagram illustrating example neighborhood windows used in tail post-processing.

FIG. 14 illustrates example neighborhood windows used in the tail post-processing unit 481 of FIG. 10. An example method of the tail post-processing is illustrated with Equation 4 (a) to (e). One of ordinary skill in the art would appreciate that the tail post-processing method is used to detect the strength and the density of the tail motion and of the feathering value in a local neighborhood window for a re-enforced decision of tail motion.

$$\text{tail}' = \begin{cases} 1 & (t > 0) \& (v > 0) \\ 0 & \text{otherwise} \end{cases} \quad \text{Eqn 4(a)}$$

where $$t = (\text{tail}_{i,j} > 0) \& \left(\sum_{i=-2}^{2} r_i \geq TailCntTh\right) \& \quad \text{Eqn 4(b)}$$

$$\left(\sum_{i=-2}^{2} (r_i > 0) \geq TailCntInRowTh\right)$$

$$r_i = \sum_{j=-2}^{2} (\text{tail}_{i,j} > 0) \ i \in [-2, 2] \quad \text{Eqn 4(c)}$$

and $$v = \quad \text{Eqn 4(d)}$$

$$\left(\sum_{i=-2}^{2} s_i \geq TailVFCntTh\right) \& \left(\sum_{i=-2}^{2} (s_i > 0) \geq TailVFCntInRowTh\right)$$

$$s_i = \sum_{j=-2}^{2} (vf_{i,j} > TailVFTh) \ i \in [-2, 2]. \quad \text{Eqn 4(e)}$$

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A global video checker apparatus, comprising:
a global video check for cadence with repeat field unit;
a global video check for cadence without repeat field unit;
a multiplexer coupled to the global video checker for cadence with repeat field unit and the global video checker for cadence without repeat field unit; and
a temporal control unit coupled to the multiplexer,
wherein the global video check for cadence with repeat field unit comprises:
an inter-frame motion detector;
a repeat field motion detector coupled to the inter-frame motion detector;
a summing unit coupled to the repeat field motion detector; and
a video fallback mode decision unit coupled to the summing unit, and
wherein the global video check for cadence without repeat field unit comprises:
a feathering detector;
a tail detector; and
a video fallback mode decision unit coupled to the feathering detector and the tail detector,
wherein the multiplexer is configured to receive a cadence signal and select a video fallback mode flag provided from the global video check for cadence with repeat field unit or the global video check for cadence without repeat field unit based on the cadence signal, and
wherein the cadence signal is provided by an external unit.

2. The apparatus of claim 1, wherein the temporal control unit is configured to receive video fallback mode flags from a plurality of fields and provide a temporally converged video fallback mode flag.

3. The apparatus of claim 1, wherein the global video check for cadence with repeat field unit comprises:
an inter-frame motion detector;
a repeat field motion detector coupled to the inter-frame motion detector;
a summing unit coupled to the repeat field motion detector; and
a video fallback mode decision unit coupled to the summing unit.

4. The apparatus of claim 3, wherein the inter-frame motion detector is configured to provide inter-frame motion signals.

5. The apparatus of claim 3, wherein the inter-frame motion detector is shared with an external unit.

6. The apparatus of claim 3, wherein the repeat field motion detector is configured to compare a plurality of inter-frame motion values in a neighborhood window with a motion threshold when a current field is a repeat field and provides a detected repeat field motion flag for a center pixel of the neighborhood window based on a density of motion in a local window.

7. The apparatus of claim 6, wherein the repeat field motion detector is configured to provide the detected repeat field motion flag according to the equations $$MRpt = $$

$$\begin{cases} 1 & (M13_{0,0} > MRptTh) \& ((cnt \geq MRptSumTh) \,|\, (c_0 \geq MRptColTh)) \\ 0 & \text{otherwise} \end{cases}$$

where $$cnt = \max\left(\sum_{j=-1}^{1} c_j, \sum_{i=-1}^{i} r_i\right)$$

and $$r_i = \sum_{j=-2}^{2} (M13_{i,j} > MRptTH) \ i \in [-1, 1]$$

$$c_j = \sum_{i=-2}^{2} (M13_{i,j} > MRptTh) \ j \in [-1, 1].$$

8. The apparatus of claim 3, wherein the summing unit accumulates a plurality of detected repeat field motions and provides a repeat field motion sum.

9. The apparatus of claim 3, wherein the video fallback mode decision unit compares a repeat field motion sum with a user defined threshold.

10. The apparatus of claim 1, wherein the global video check for cadence without repeat field unit comprises:
a feathering detector;
a tail detector; and
a video fallback mode decision unit coupled to the feathering detector and the tail detector.

11. The apparatus of claim 10, wherein the feathering detector comprises:
an inter-frame motion detector;
a field buffer;
a second multiplexer;
a vertical frequency analysis unit coupled to the second multiplexer;

a motion adaptiveness unit coupled to the field buffer and the vertical frequency analysis unit;

a vertical frequency post-processing unit coupled to the motion adaptiveness unit; and a summing unit coupled to the vertical frequency post-processing unit.

12. The apparatus of claim 11 further comprising a comparator coupled to the inter-frame motion detector, wherein the field buffer is coupled to the comparator.

13. The apparatus of claim 11, wherein the inter-frame motion detector is shared with an external unit.

14. The apparatus of claim 11, wherein the vertical frequency analysis unit is configured to provide detected feathering values from a plurality of pixels from a current field and a coupling field.

15. The apparatus of claim 14, wherein the vertical frequency analysis unit is configured to provide the detected feathering values according to the equations $$vfreq_i = \begin{cases} freq_{k,1} - freq_{k,2} & fielddiff_k \geq MonotoneTh \\ 0 & otherwise \end{cases}$$

$$k = 0, 1, 2$$

where $$freq_{k,1} = \sum_{i=0}^{3} ((y_{k+i} - mean_k) \cdot (y_{k+i+1} - mean_k) < 0)$$

$$freq_{k,2} = \sum_{i=0}^{2} ((y_{k+1} - mean_k) \cdot (y_{k+i+2} - mean_k) < 0)$$

$$mean_k = ((y_k + y_{k+2} + y_{k+4}) \times 2 + (y_{k+1} + y_{k+3}) \times 3 + 6)/12$$

and $$fielddiff_k = |(y_k + y_{k+2} + y_{k+4}) \times 2 - (y_{k+1} + y_{k+3}) \times 3|/12$$

$$vf = \begin{cases} \max(vfreq_0, vfreq_1) & currfield = \text{top} \\ \max(vfreq_1, vfreq_2) & currfield = \text{bottom}. \end{cases}$$

16. The apparatus of claim 11, wherein the motion adaptiveness unit is configured to provide a moving feathering signal from a detected feathering value and inter-frame motion values at time t and t−1.

17. The apparatus of claim 16, wherein the motion adaptiveness unit comprises:

a max operator; and a third multiplexer coupled to a max operator, wherein the max operator is configured to receive recursive inter-frame motions and provide to the third multiplexer a maximum motion value; and wherein the third multiplexer is configured to output the detected feathering value as the moving feathering signal if the maximum motion value is classified as motion or '0' otherwise.

18. The apparatus of claim 11, wherein the vertical frequency post-processing unit is configured to provide a post-processed feathering value from a plurality of moving feathering values in a local neighborhood window.

19. The apparatus of claim 18, wherein the vertical frequency post-processing unit is configured to provide the post-processed feathering values according to the equations $$vf'' = \begin{cases} vf' & (vf'_{0,0} > VFTh) \ \& \ (((sum \geq VFSumTh) \\ & \& (rcnt = true)) | (c_0 \geq (VFColTh \times 4))) \\ 0 & otherwise \end{cases}$$

where $$sum = \sum_{j=-2}^{2} c_j$$

$$c_j = \sum_{i=-2}^{2} vf'_{i,j}$$

and $$rcnt = ((r_{-2} \geq VFRowTh) \ \& \ (r_{-1} \geq VFRowTh) \ \& (r_0 \geq VFRowTh) \ \&$$
$$(r_{-1} \geq VFRowTh) \ \& \ (r_2 \geq VFRowTh))$$

$$r_i = \sum_{j=-2}^{2} (vf'_{i,j} > VFTh) \ i \in [-2, 2].$$

20. The apparatus of claim 10, wherein the tail detector comprises:

an inter-field motion detector;

a global detail estimator coupled to the inter-field motion detector;

a tail analysis unit coupled to the global detail estimator;

a tail post-processing unit coupled to the tail analysis unit; and a summing unit coupled to the tail post-processing unit.

21. The apparatus of claim 20 further comprising a pre-filter, wherein the inter-field motion detector is coupled to the pre-filter.

22. The apparatus of claim 20, wherein the global detail estimator comprises:

an average operator configured to provide an average of inter-field motions at times t−3 and t−1;

a min operator coupled to the average operator configured to select a minimum value of the average and an inter-field motion at time t−2; and a thresholding unit coupled to the min operator configured to compare the minimum value with a set of thresholds and select a classified global detail level.

23. The apparatus of claim 20, wherein the tail analysis unit comprises:

a first adder coupled to a first multiplexer;

a second adder coupled to a second multiplexer;

a third multiplexer;

a comparator and sign unit coupled to the first adder and the third multiplexer;

a sign unit coupled to the second adder;

a sign comparator coupled to the comparator and sign unit and the sign unit;

an absolute operator coupled to the first adder;

a fourth multiplexer coupled to the sign comparator and the absolute operator.

24. The apparatus of claim 20, wherein the tail post-processing unit is configured to detect a strength and density of a tail motion and a feathering value in a local neighborhood window and provide a post-processed tail motion.

25. The apparatus of claim 24, wherein the tail post-processing unit is configured to provide the post-processed tail motion according to the equations $$\text{tail}' = \begin{cases} 1 & (t > 0) \ \& \ (v > 0) \\ 0 & \text{otherwise} \end{cases}$$

where $$t = (\text{tail}_{i,j} > 0) \ \& \ \left(\sum_{i=-2}^{2} r_i \geq \text{TailCntTh}\right) \ \& \ \left(\sum_{i=-2}^{2} (r_i > 0) \geq \text{TailCntInRowTh}\right)$$

$$r_i = \sum_{j=-2}^{2} (\text{tail}_{i,j} > 0) \ i \in [-2, 2]$$

and $$v = \left(\sum_{i=-2}^{2} s_i \geq \text{TailVFCntTh}\right) \ \& \ \left(\sum_{i=-2}^{2} (s_i > 0) \geq \text{TailVFCntInRowTh}\right)$$

$$s_i = \sum_{j=-2}^{2} (vf_{i,j} > \text{TailVFTh}) \ i \in [-2, 2].$$

\* \* \* \* \*